United States Patent [19]

Shaw

[11] 4,245,476
[45] * Jan. 20, 1981

[54] SOLAR AUGMENTED HEAT PUMP SYSTEM WITH AUTOMATIC STAGING RECIPROCATING COMPRESSOR

[75] Inventor: David N. Shaw, Unionville, Conn.

[73] Assignee: Dunham-Bush, Inc., West Hartford, Conn.

[ * ] Notice: The portion of the term of this patent subsequent to Apr. 10, 1996, has been disclaimed.

[21] Appl. No.: 604

[22] Filed: Jan. 2, 1979

Related U.S. Application Data

[63] Continuation of Ser. No. 806,407, Jun. 14, 1977, Pat. No. 4,148,436, which is a continuation-in-part of Ser. No. 782,675, Mar. 30, 1977, Pat. No. 4,086,072, which is a continuation-in-part of Ser. No. 653,568, Jan. 29, 1976, Pat. No. 4,058,988.

[51] Int. Cl.³ .............................................. F25B 27/00
[52] U.S. Cl. ..................................... 62/2; 237/2 B
[58] Field of Search ................. 62/175, 510, 228.8, 62/196 A, 2, 238 E, 324 D, 199; 237/2 B; 236/1 EA

[56] References Cited

U.S. PATENT DOCUMENTS

| 4,091,636 | 5/1978 | Margen | 62/238 |
| 4,148,436 | 4/1979 | Shaw | 62/510 X |

Primary Examiner—William E. Wayner
Attorney, Agent, or Firm—Sughrue, Rothwell, Mion, Zion and Macpeak

[57] ABSTRACT

A multi-cylinder reciprocating compressor is automatically staged at low ambient temperature to improve refrigerant volume flow while facilitating subcooler operation and return of vaporized refrigerant from the subcooler to the inlet of the second stage cylinders of the compressor in the two stage mode. A solar evaporator substitutes for the outdoor coil when the solar heated storage tank temperature exceeds that of ambient. During staging mode, the wrist pins of the low side cylinders and the high side cylinder undergo proper load reversals, since intermediate suction pressure is applied to the wrist pin of the high side cylinders.

17 Claims, 5 Drawing Figures

FIG 2 HEATING MODE (SOLAR)

HEATING MODE
AIRSOURCE
EVAPORATOR

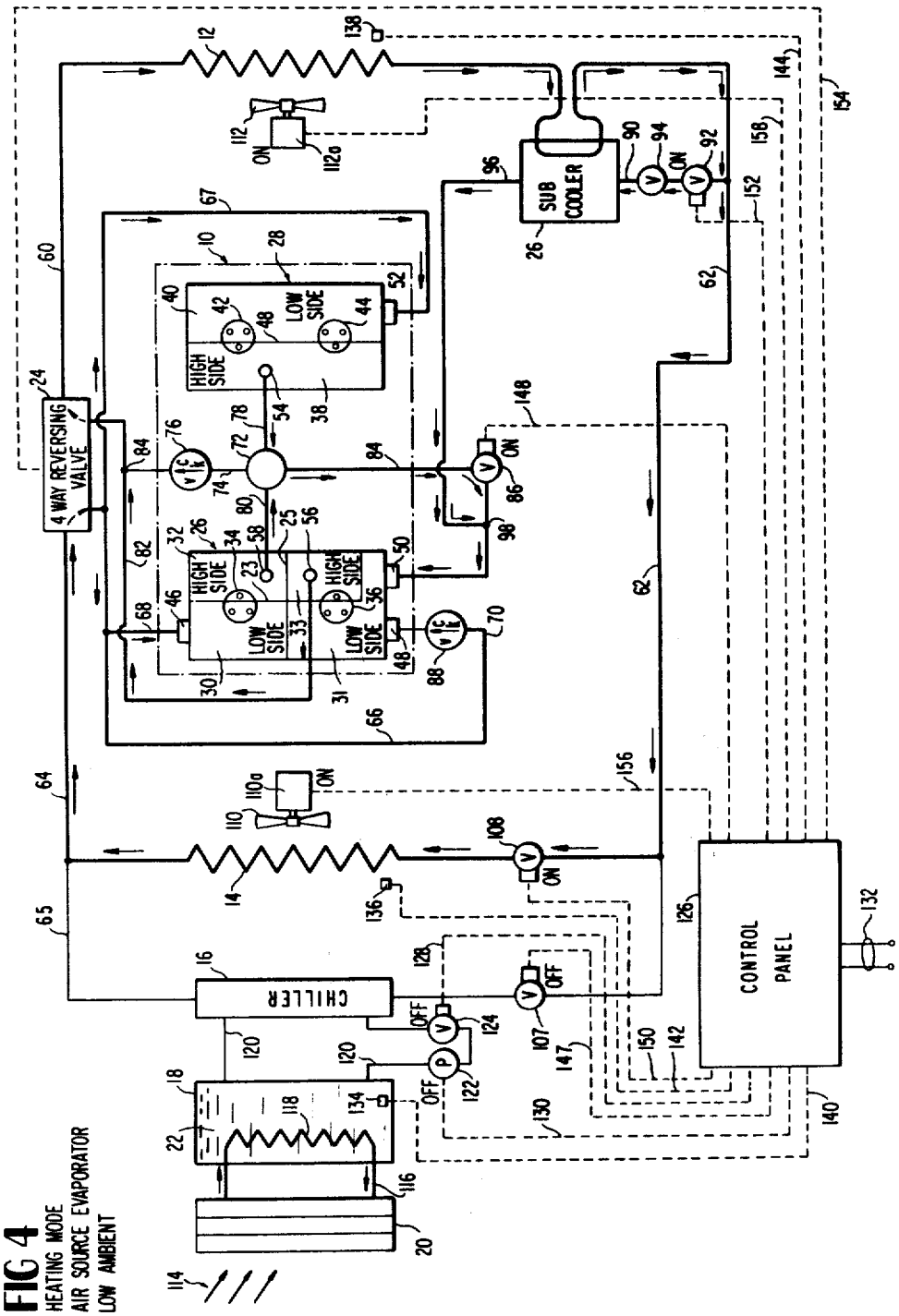

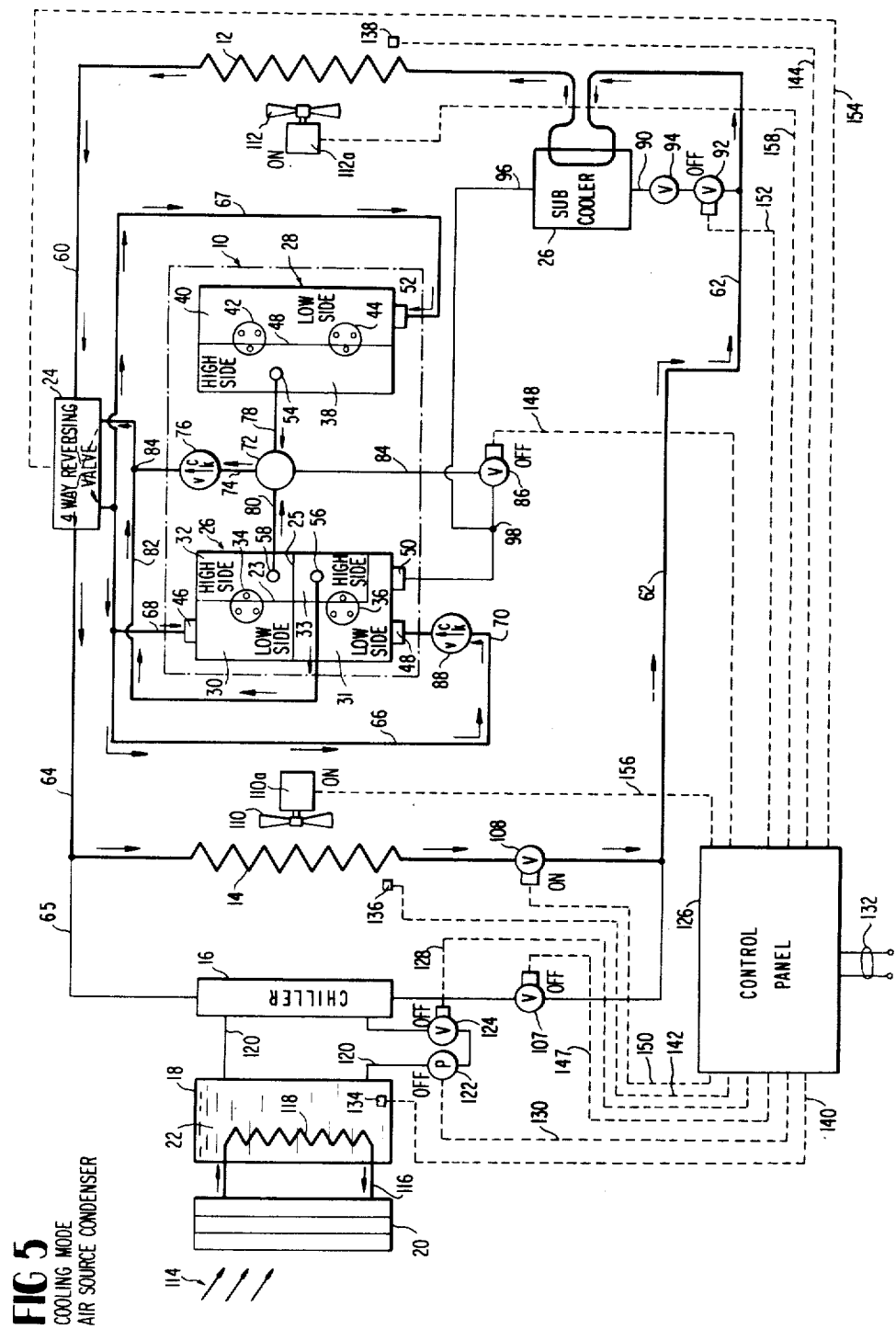

SOLAR AUGMENTED HEAT PUMP SYSTEM WITH AUTOMATIC STAGING RECIPROCATING COMPRESSOR

This application is a continuation application of application Ser. No. 806,407 filed June 14, 1977 for SOLAR AUGMENTED HEAT PUMP SYSTEM WITH AUTOMATIC STAGING RECIPROCATING COMPRESSOR, now U.S. Pat. No. 4,148,436 issuing Apr. 10, 1979 which is a continuation-in-part application of application Ser. No. 782,675 filed Mar. 30, 1977, entitled AIR SOURCE HEAT PUMP WITH MULTIPLE SLIDE ROTARY SCREW COMPRESSOR/EXPANDER, now U.S. Pat. No. 4,086,072 issuing Apr. 25, 1978, which in turn is a continuation-in-part application of application Ser. No. 653,568 filed Jan. 29, 1976, entitled HEAT PUMP SYSTEM WITH HIGH EFFICIENCY REVERSIBLE HELICAL SCREW ROTARY COMPRESSOR, now U.S. Pat. No. 4,058,988, issuing Nov. 22, 1977, both assigned to the common assignee.

BACKGROUND OF THE INVENTION

1. Field of the Invention

This invention relates to air source heat pumps, and more particularly to solar augmented air source heat pump systems employing a multi-cylinder reciprocating compressor.

2. Description of the Prior Art

A reciprocating compressor has long been employed to compress refrigerant vapor in an air source heat pump system with the compressor in series with and between the outdoor and indoor coils which coils trade functions; the outdoor coil constituting the air source evaporator under heating mode and the indoor coil, the condenser; while during cooling mode the indoor coil becomes the system evaporator and the outdoor coil becomes the air source condenser. When the heat pump is operating under heating mode, the system compression ratio increases as the air source heat pump system operates under colder and colder ambient. For instance, assuming that the reciprocating compressor comprises four cylinders and assuming 100% volumetric efficiency under single stage operation would equal four flow units, at 50% volumetric efficiency the single stage operation results is equivalent to two flow units. In higher system compression ratios, the reciprocating compressor volumetric efficiency drops to very low value and 25% volumetric efficiency under max heating conditions are common. For a single stage four cylinder operation, the result is one flow unit at the higher compressor ratios.

Further, it is conventional to improve system efficiency by incorporating a subcooler between the indoor and outdoor coils which functions to subcool the liquid refrigerant downstream of the coil constituting the condenser and prior to feeding the same to the coil acting as an evaporator of the system. A portion of the high pressure liquid refrigerant is bled from the system and vaporized to further reduce the temperature of that portion of the refrigerant delivered to the coil functioning as the evaporator for the system under that particular mode. The vapor generated in the subcooler is at a pressure which is well above the suction pressure to the reciprocating compressor. The expansion of that refrigerant to the pressure of the refrigerant vapor passing from the downstream side of the coil functioning as the evaporator in the system and entering the inlet or suction side of the compressor, constitutes a system loss reducing the efficiency of the heat pump system.

Solar collectors have been employed as a source of thermal energy to supplement thermal energy input to refrigeration systems, particularly heat pumps.

It is therefore an object of the present invention to provide a simplified automatic heat pump system employing a reciprocating compressor which minimizes the reduction in real volume of suction gas pumped by the reciprocating compressor as the system compression ratio increases when the air source heat pump system operates in colder and colder ambient.

It is a further object of this invention to provide a simplified air source heat pump system which automatically shifts from the air source evaporator to a solar source evaporator under system heating mode when the temperature of the solar source exceeds that of the air source evaporator ambient or when otherwise determined to be economical.

It is a further object of this invention to provide an improved air source heat pump employing a multi-cylinder reciprocating compressor in which the cylinders are staged while maintaining load reversal on the wrist pins of the reciprocating compressor pistons and connecting rod assemblies under automatic staging conditions.

It is a further object of this invention to provide an improved air source heat pump system employing an automatic staging, multi-cylinder reciprocating compressor, wherein the vapor returned from a system subcooler may be selectively directed to the suction side of the high stage cylinder or cylinders under low temperature ambient conditions.

SUMMARY OF THE INVENTION

The invention is directed to an air source heat pump system of the type including a first heat exchanger forming an indoor coil, a second heat exchanger forming an outdoor coil, and a multi-cylinder reciprocating compressor. Conduit means carrying refrigerant includes a reversing valve which connects the first and second heat exchangers and the compressor in a closed series primary refrigeration loop to permit the outdoor and indoor coils to operate alternatively as the evaporator and condenser for the system, depending upon heating or cooling mode. The improvement comprises a third heat exchanger with the conduit means connecting the third heat exchanger across the outdoor coil. Selectively operable valve means within said conduit means causes refrigerant to flow through said third heat exchanger while isolating the outdoor coil from the closed primary loop. A storage tank containing a mass of heat sink fluid is connected in a secondary closed loop including the third heat exchanger, and a solar collector is operatively connected to the storage tank for normally supplying heat to the heat sink fluid. Means are provided for sensing the temperature of the ambient air passing over the outdoor coil and the temperature of the stored heat sink fluid, and means are provided for comparing said temperatures and for operating said selectively operable control valve means.

The heat sink fluid of the storage tank may comprise glycol or other fluids, and the system may be provided with a pump and solenoid valve means within the closed loop connecting the storage tank to the solar assist evaporator coil for controlling circulation of the glycol therebetween.

Preferably, the reciprocating compressor comprises a plurality of cylinders and the system further comprises means for automatically controlling primary loop refrigerant circulation to and from the compressor for operating the compressor in single stage with all cylinders in parallel or for placing, in response to ambient temperature drop below a predetermined value under system heating mode, at least one cylinder under high side multi-stage compressor operation. The system may further include means for jointly or alternatively operating the outdoor coil and the solar evaporator coil as evaporators for the heat pump system under heating mode. The system preferably includes a subcooler for subcooling condensed refrigerant within the primary loop under at least system heating mode and means for selectively returning vaporized refrigerant to the low stage or high stage cylinders of the compressor.

BRIEF DESCRIPTION OF THE DRAWINGS

FIG. 4 is the schematic diagram of FIG. 1 with the heat pump system in low ambient air source evaporator, staged compressor and subcooling operation, heating mode.

FIG. 5 is the schematic diagram of FIG. 1 with the heat pump system in air source condenser, cooling mode.

DESCRIPTION OF THE PREFERRED EMBODIMENT

Figure 1:
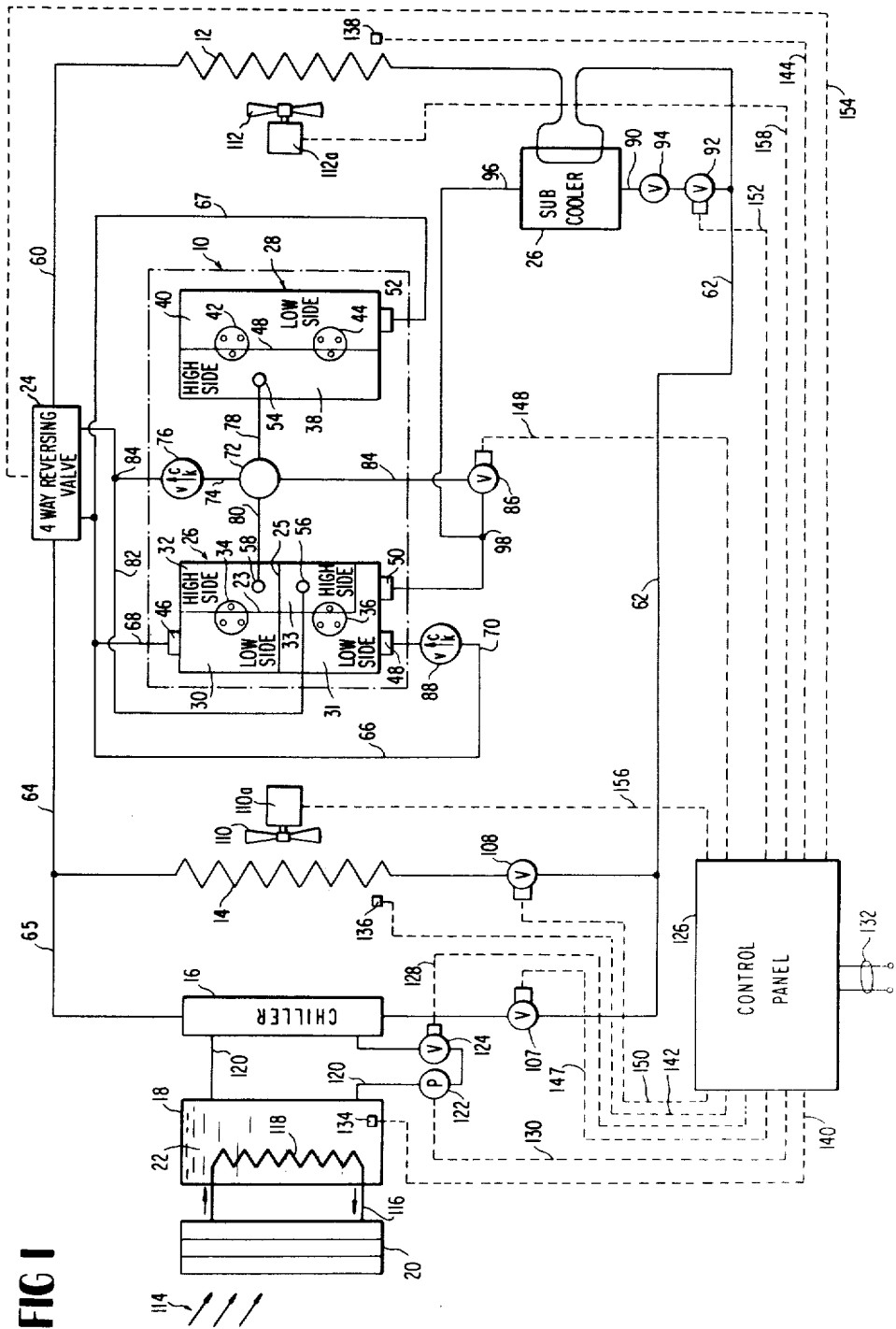
FIG. 1 is a hydraulic schematic circuit diagram of the improved solar augmented air source heat pump system with automatic staging reciprocating compressor.

The present invention is illustrated in schematic diagram form in FIG. 1 as a preferred embodiment of the invention. The principal components comprise a four cylinder multi-stage reciprocating compressor indicated generally at 10, a first heat exchanger 12 constituting the indoor coil, a second heat exchanger 14 constituting the outdoor coil, a third heat exchanger 16 constituting the solar augmented evaporator or chiller, a heat sink storage tank 18, a solar collector 20 for supplying thermal energy to the heat sink fluid 22 such as glycol within the storage tank, a four way reversing valve 24 and a primary loop subcooler 26. Conduit means connects the four way reversing valve 24, the reciprocating compressor 10, the indoor coil 12, and the outdoor coil 14 in a series, closed primary loop refrigeration circuit.

In that respect, the reciprocating compressor 10 comprises a left cylinder head 26 and a right cylinder head 28. The left cylinder head 26 includes manifold means 23 and 25 defining a low side 30 and a high side 32 for the first cylinder 34 and a low side 31 and a high side 33 for a second cylinder 36. The right cylinder head 28 comprises a low side 38 and a high side 40 for the compressor's third cylinder 42 and fourth cylinder 44, by way of manifold means 45. Compressor inlets for the left cylinder head 26 are provided at 46, 48 and 50, while a single inlet is provided for both cylinders 42 and 44 of the right cylinder head 28 as at 52. A common outlet 54 for both cylinders 42 and 44 is provided for the right cylinder head 28 on the high side 38, while for the compressor left cylinder head 26, two high side outlets are provided: at 56 for cylinder 36, and at 58 for cylinder 34.

The primary refrigeration loop incorporating compressor 10, indoor coil 12 and outdoor coil 14 includes conduit 60 between four way reversing valve 24 and the indoor coil 12, conduit 62 between the indoor coil 12 and the outdoor coil 14, and conduit 64 from the outdoor coil 14 to the opposite side of the four way reversing valve 24. Conduit 66 connects the four way reversing valve 24 to left cylinder head inlets 46 and 48 by way of branch lines or conduits 68 and 70, and employs conduit 67 which terminates at inlet 52 for the right cylinder head 28. Manifold 72 acts to interconnect the high sides 32 and 38 of the left cylinder head cylinder 34 and right cylinder head cylinders 42 and 44 to the four way reversing valve 24 through line or conduit 74 which extends between the manifold 72 and the four way reversing valve 24. Line 74 incorporates a check valve 76 permitting flow from manifold 72 to the four way reversing valve 24 but preventing reverse flow. The high side of the right cylinder head 28 is connected to the manifold by way of line or conduit 78 which connects to the outlet 54 of the compressor right cylinder 28 on the high side 38. A conduit 80 connects the manifold 72 to the outlet 58 on the high side 32 of the left cylinder head cylinder 34. In addition, a line or conduit 82 connects outlet 56 of the left cylinder head for cylinder 36 to the four way reversing valve 24, by intersecting line 74 at point 84 downstream of the check valve 76.

A further line or conduit 84 connects the manifold 72 to the low side inlet 50 of the compressor left cylinder head 26 feeding cylinder 36. This line includes a solenoid operated control valve 86. Within conduit or branch line 70, there is provided a check valve 88 which permits flow from the four way valve 24 to the inlet 48 for compressor cylinder 36 but prevents reverse flow therein.

The subcooler 26 in the illustrated embodiment is connected within line 62 intermediate of the indoor and outdoor coils. A branch line or conduit 90 carries a solenoid operated control valve 92 for controlling the bleed of high pressure liquid refrigerant from the primary loop which vaporizes by expansion through a thermal expansion valve 94 or its equivalent, also within line 90, to subcool that portion of the liquid refrigerant within that portion of line 62 within subcooler 26, with the vaporized refrigerant returning to the compressor by way of vapor return line or conduit 96. Conduit 96 intersects conduit 84 at point 98.

The primary refrigerant loop includes solenoid operated control valve 108 within line 62 and solenoid operated control valve 107 within conduit or line 65 to control primary refrigerant flow so as to direct that flow either through the outdoor coil 14 or the solar evaporator coil or chiller 16. The outdoor coil 14 is provided with a fan or blower 110 driven by fan motor 110a. The indoor coil is provided with fan or blower 112 driven by motor 112a. These are appropriately energized for operation to force ambient air and indoor air over the coils respectively in conventional fashion.

The solar assist air source heat pump system of the present invention employs the solar collectors 20 as an alternate source of heat by solar impingement as at 114, the solar collectors 20 being connected to the storage tank by way of a closed loop conduit 116 including coil 118 immersed within the glycol or heat sink medium 22.

In turn, the glycol circulates between the solar assist chiller or evaporator 16 by way of conduit means 120. Fluids, therefore, perform the heat transfer of heat randomly from the solar collector to the storage tank heat sink medium 22 and upon demand from that medium to the chiller 16. Conduit means 120 incorporates solenoid operated control valve 122 and pump 124 for forced circulation of the glycol 22.

In order to effect the automatic control of the solar augmented air source heat pump system of the present invention, the solenoid operated control valve 124 is connected to a control panel 126 by line 128, while the pump 122 is connected by line 130 to the same control panel. The control panel 126 is energized through lines 132 from an electrical source (not shown). Providing input signals to the control panel 126 to effect control of the four way reversing valve 24 and solenoid control valves 86, 92, 107, 108 and 124 and pump 124 are: thermobulb or temperature sensor 134 mounted within the storage tank 18 and immersed within the heat sink fluid 22, thermobulb or temperature sensor 136 within the air stream of ambient air passing over the surface of the second heat exchanger or outdoor coil 14 and thermobulb or temperature sensor 138 positioned in the path of the indoor air which moves over the indoor coil 12. Alternatively, thermobulb 138 may be placed in the room or other enviornment being treated by indoor coil 12. The control or power signals emanate from control panel 126 and pass to the various valves including four way reversing valve 24.

Thermobulb 134 is connected to the control panel 126 by line 140, thermobulb 136 to the control panel 126 by line 142 and thermobulb 138 to the control panel 126 by line 144.

Further, line 150 connects the solenoid operated control valve 108 to the same control panel and companion valve 107 is connected thereto by line 147. Line 148 connects the solenoid operated control valve to that panel, and line 152 connects the solenoid operated control valve 92 to said control panel. Fan motor 110a is connected to the source via control panel 126 by line 156, and the electric motor 112a, driving fan 112, is connected to the control panel 126 by way of line 158.

Since the system comprises a reversible refrigeration system, the indoor coil 12 and the outdoor coil 14 must operate as evaporator and condenser coils alternately and respectively when the system is under cooling and heating modes. Expansion means must be provided on the inlet sides of those coils when acting as evaporators, as well as chiller 16, to effect expansion of the high pressure liquid refrigerant within the coils for the purpose of absorbing heat. For simplicity, the expansion devices are not shown, and likewise, while the subcooler 26 is illustrated as being associated with the indoor coil and functioning only when the indoor coil acts as a condenser, appropriately the subcooler may be incorporated within the system such that it will function to subcool liquid refrigerant delivered to the indoor coil 12 under cooling mode with that coil functioning as an evaporator rather than a condenser. In that respect, further reference may be had to copending application Ser. No. 782,675 filed Mar. 30, 1977, entitled "AIR SOURCE HEAT PUMP WITH MULTIPLE SLIDE ROTARY SCREW COMPRESSOR/EXPANDER" by the same inventor and assigned to the common assignee, now U.S. Pat. No. 4,086,072. The control panel 126 is of conventional design and functions to compare the temperature of the liquid medium 22 stored within the storage tank 18 and the temperature of the ambient air as provided by signals from temperature sensors 134 and 136 respectively for in turn controlling the condition of solenoid operated control valves 107 and 108 for controlling the flow of primary loop refrigerant through outdoor coil 14 and solar assist chiller or evaporator 16. In the illustrated embodiment of the invention, the control panel 126 comprises conventional circuitry including relays and the like for actuating selectively the reversing valve 24 and the solenoid operated control valves 86, 92, 107 and 108 in response to signals emanating from the temperature sensors 134, 136 and 138 and transmitted to that panel.

The operation of the improved air source heat pump system of the present invention may be seen under various modes by reference to FIGS. 2-5.

Figure 2:
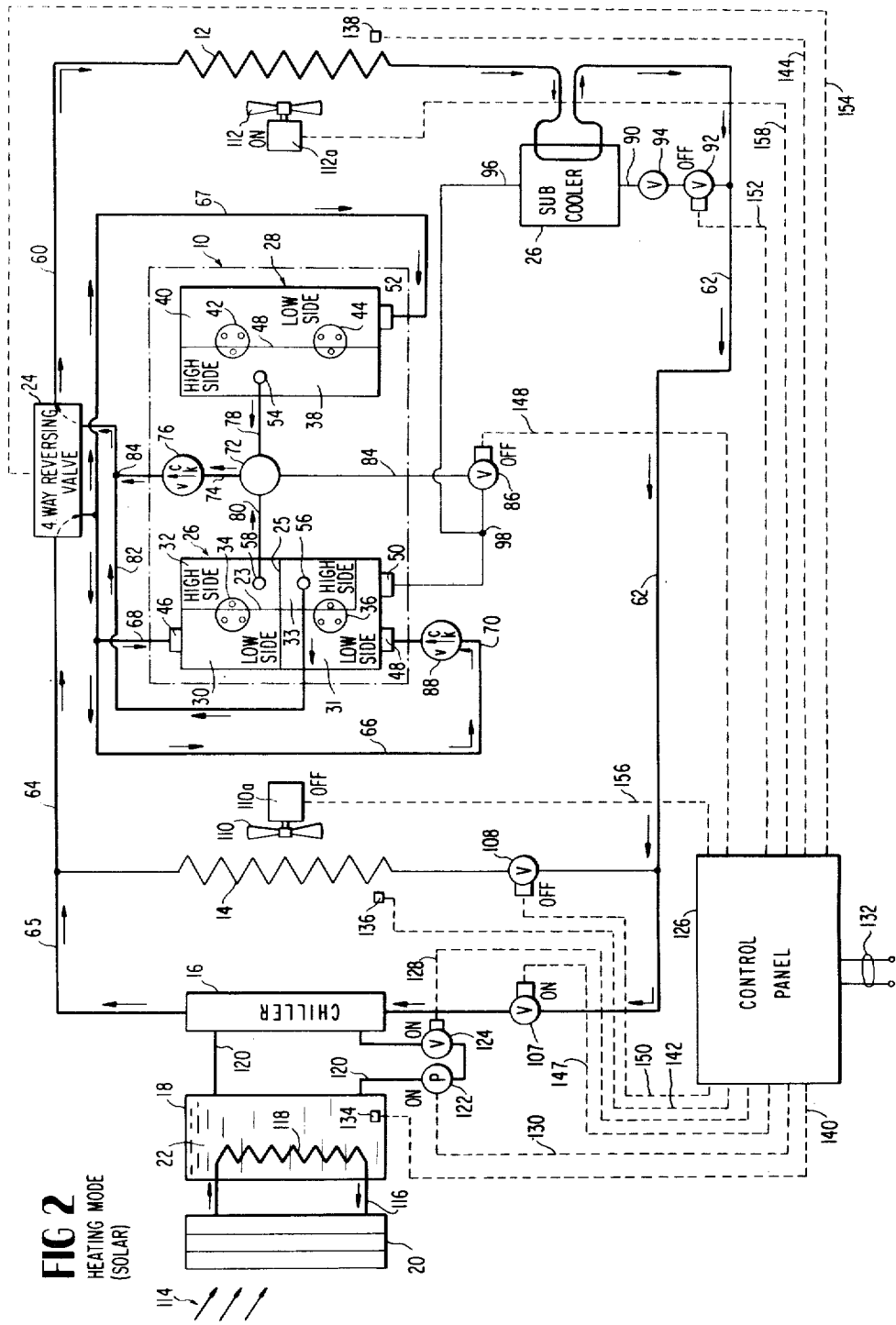
FIG. 2 is the schematic diagram of FIG. 1 with the heat pump system of FIG. 1 in single stage compressor, solar evaporator heating mode.

Turning first to FIG. 2, the system is shown under a heating mode, wherein the indoor coil 12 is functioning as a condenser, the outdoor coil 14 is not in operation, fan 110 is turned off, solar evaporator or chiller 16 is functioning as the evaporator coil absorbing heat from the heat sink storage medium 22 as received from the solar collectors 20 and the compressor 10 is acting as a single stage compressor. The operation is automatically controlled. Thermobulb 138 associated with the room or other controlled environment, senses the temperature of the air passing over the indoor coil 12, denotes the necessity to heat that environment and initiates a control signal from the control panel 126 to the four way reversing valve 24 by way of control line 154 to keep the control valve in position such that conduits or lines 64 and 66 are connected together, such that low pressure refrigerant vapor discharging from the solar assist evaporator 16 is directed to inlets 46 and 48 of the left cylinder head 26 cylinders 34 and 36, and by way of inlet 52 at the low side of the right cylinder head 28 for both cylinders 42 and 44. The four way reversing valve 24 further makes a connection between lines 60 and 74 such that compressed refrigerant vapor or gas under single stage compression is provided to the indoor coil 12 acting as the condenser for the primary loop, the refrigerant being compressed by the individual cylinders 34, 36, 42 and 44 and discharging in parallel by way of outlets 54, 56 and 58 and passing by way of manifold 72 for outlets 54 and 58 through line 74 with outlet 52 discharging compressed refrigerant vapor into line 82 leading to line 74 downstream of the check valve 76.

Further, the control panel senses the temperature of the ambient air adjacent the outdoor coil 14 by way of temperature sensor 136 and senses the temperature of the heat sink media 22 within the storage tank 18 by means of temperature sensor 134, and signals are sent via lines 142 and 140 respectively to the comparator of control panel 126.

Under the mode of FIG. 2, the temperature of the heat sink media such as glycol 22 within the storage tank 18 is warmer than the ambient passing over the outdoor coil 14 by a predetermined amount, and a control signal is sent via line 147 from control panel 126 to the solenoid operated control valve 107 within line 65. The solenoid operated control valves of the illustrated embodiment are of the normally closed type and open when energized, therefore, valve 107 is energized while valve 108 is not. The refrigerant within the primary loop is prevented from flowing through line 64 and the outdoor coil 14 and is bypassed to the solar evaporator or chiller 16. At the same time, pump 122 and solenoid operated valve 124 are energized so that the glycol is circulated in a closed loop including tank 18 and solar evaporator 16; current emanating from the control panel 126 and passing to elements 122 and 124 via lines 130 and 128 respectively. Further, since the ambient temperature is relatively high, there is no necessity for operating the reciprocating compressor 10 in multistage mode, and therefore, the control panel 126 does not energize solenoid operated control valves 86 and 92, and the system subcooler is not operated. The heat load of indoor coil 12 is adequately supplied in this mode by chiller 16.

Figure 3:
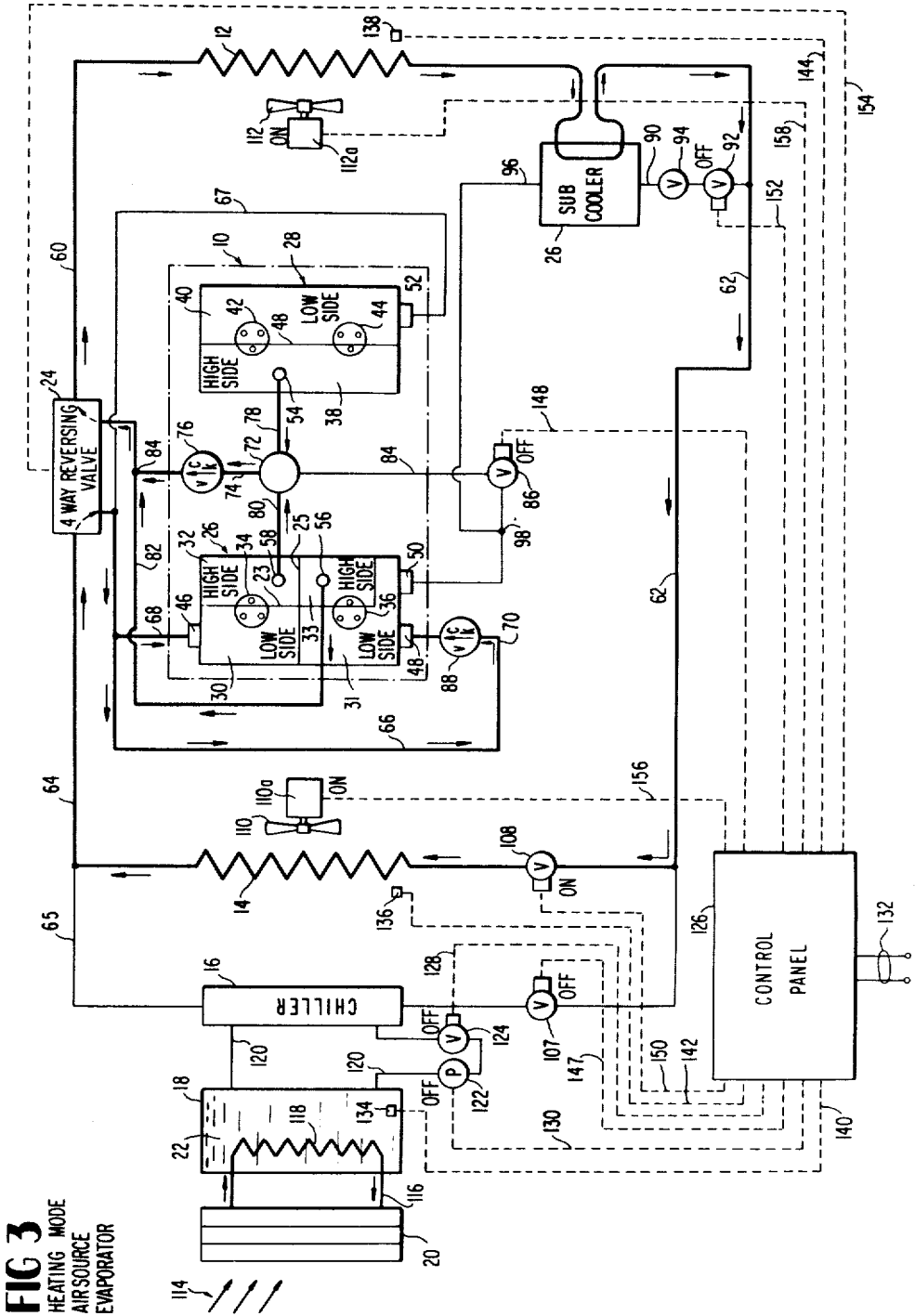
FIG. 3 is the schematic diagram of FIG. 1 with the heat pump system in high ambient air source evaporator heating mode.

Turning next to FIG. 3, the heat pump system is still operating under the heating mode, and at relatively high ambient temperature. However, the temperature of the glycol 22 within storage tank 18 has dropped below the predetermined differential between that temperature and the temperature of the ambient air passing over the outdoor coil 14 as sensed by temperature sensor 136. Temperature sensor 138 associated with the indoor coil 12 is still calling for heat, and therefore the indoor coil must function as a condenser, thus the four way reversing valve 24 remains under the same condition of the operation as in FIG. 2. The control panel 126 terminates the energization of the solenoid operated control valve 107 which then automatically closes and the control panel energizes the solenoid operated control valve 108 placing the outdoor coil 14 in the primary loop in place of the solar evaporator 16. At the same time, current passes via line 156 from panel 126 to the fan motor 110a energizing that motor, causing forced air circulation over outdoor coil 14. At the same time, pump 124 and solenoid operated valve 122 are de-energized, terminating circulation of glycol from the storage tank 18 to the solar evaporator 16. Heat, however, is continuously absorbed by the solar collectors 20 as shown by radiation 114, assuming proper solar conditions, and the temperature of the glycol is raised. Thus, even though there is no solar energy applied to the heat pump system, solar energy is being stored within tank 18 and the temperature of the gylcol is increasing. While not shown, the system can be operated such that the solar evaporator may act in addition to and in parallel with the air source evaporator 14. Both solenoid operated control valves 107 and 108 are energized to permit primary loop refrigerant to flow through lines 64 and 65 simultaneously, picking up heat both from the storage tank 18 and from the ambient air passing over the outdoor coil 14.

As the ambient temperature drops, and assuming that there is no solar energy augment because of the low temperature of the glycol 22 within the storage tank 18, and further assuming that the environment being conditioned is calling for additional heat by way of temperature sensor 138, the automatically controlled air source heat pump system of the present invention reaches a predetermined but typical volumetric efficiency switchover point which may be 25%, as mentioned previously. At that point, the system automatically shifts to the mode of operation illustrated in FIG. 4. The control panel 126 energizes the solenoid operated control valves 86, 92 and 108 upon energization of control valve 86, line 84 opens from manifold 72 to the inlet 50 on the low side of the left cylinder head 26 for cylinder 36 of compressor 10. Further, the control panel 126 acts to energize the solenoid operated control valve 92 with the subcooler in operation, the vaporized refrigerant from the return line 96 passes to line 84 leading from the manifold 72 to inlet 50 on the low side of cylinder 36 of the left cylinder head 26 of compressor 10. Under this mode of operation, cylinders 34, 42 and 44 are operating to provide the first stage of compression for the refrigerant, while cylinder 36 acts to compress the first stage refrigerant vapor discharge in a second stage of compression. Assuming 25% volumetric efficiency, with the compressor staged there will be three low side cylinders operating at a volumetric efficiency of approximately 75% resulting in 2.25 flow units in comparison to one flow unit. Thus, the compressor operates at 2.25 times the volume of flow that it would have with all cylinders operating single stage at a 12 to 1 compression ratio, greatly improving system efficiency in this mode under such low ambient conditions.

Check valve 76 closes to prevent the high pressure second stage discharge flow from line 82 to reverse in line 74 towards manifold 72 from point 85 where line 82 meets line 74 upstream of the four way reversing valve 24. The four way reversing valve 24 remains in the condition of FIGS. 2 and 3 as the system is still under heating mode. The second stage discharge by way of outlet 56 through line 82 passes to the four way reversing valve 24 and thence to line 60 leading to the indoor coil 12 which is still acting as the system condenser.

Further, the subcooler efficiently discharges its refrigerant vapor which is at a higher pressure than the pressure of the return vapor from the air source evaporator or outdoor coil 14 to compressor inlets 46, 48 and 52. The present invention advantageously meets the necessity of maintaining load reversal on the wrist pins of the reciprocating compressor pistons and connecting rod assembly, since cylinder 36 vents the crank case. The compressor crank case and resulting wrist pins are subjected to low side pressure, which is no problem under single stage operation, but when the compressor 10 is automatically staged, the crank case on the low side for cylinder 36 will be subjected to intermediate pressure (first stage discharge pressure from line 84) and the wrist pins and cylinders 34, 42 and 44 will still undergo proper reversals of loading. The cylinder 36 will also operate with proper wrist pin loading reversal in that cylinder 36 suction pressure will be applied at the wrist pin of cylinder 36. This permits the compressor 10 to be manufactured without expensive, complex and unreliable needle type wrist pin bearings.

It should be noted additionally, that under this mode of operation, the branch line 70 no longer feeds the low pressure refrigerant vapor from the discharge side of the outdoor coil 14 to the low side of cylinder 36, since vapor enters the low side of cylinder 36 by way of inlet 50 and is at a higher pressure than the vapor within line 70. The check valve 88 prevents reverse flow from the low side (first stage discharge) of cylinder 36 into the line 66.

The single, reliable and efficient heat pump system as illustrated, with automatic staging, provides a fundamental advantage over prior art heat pump systems. Automatic staging allows the subcooling loop to be incorporated automatically when it is most needed, and the subcooler automatically feeds the return vaporized refrigerant to the second stage low side of cylinder 36 by way of inlet 50.

Turning next to FIG. 5, the heat pump system is illustrated under a cooling mode where the outdoor coil 14 functions as an air source condenser. The room or other environment being conditioned by indoor coil 12 now calls for cooling of that environment and upon receipt of that signal by the control panel 126 through line 144 from temperature sensor 138, the control panel 126 directs the four way reversing valve 24 to shift to the condition shown in FIG. 5 by current application to line 154. Typically, the four way reversing valve 24 may be a spring biased solenoid operated valve such that de-energization of the valve causes lines 64 and 66 to be connected and lines 74 and 60, while upon energization, FIG. 5, lines 74 and 64 are in fluid communication and lines 66 and 60 are in fluid communication, as shown. This functions to direct the high pressure refrigerant at the discharge side of the compressor to the outdoor coil 14 which functions as an air source condenser, the vapor condensing to a liquid for passage to the indoor coil 12 which functions as an evaporator coil for the environment or area to be conditioned. As shown, the compressor 10 is operating with all four cylinders in parallel in single stage similar to the operation of FIG. 3 except in that case the system was operating under high ambient heating mode with heat exchanger 14 forming the air source evaporator. Under cooling mode conditions, solenoid valves 107, 86, 92 and 109 are off and solenoid valve 108 is on. However, in an alternate circuit arrangement, the subcooler 26 may be employed for subcooling the liquid refrigerant emanating from outdoor coil 14 and feeding indoor coil 12 for absorbing heat from the environment being conditioned.

From the above, it may be seen that the solar augmented heat pump system of the present invention involves a control system which permits the reciprocating compressor to automatically stage itself on demand.

While the reciprocating compressor 10 is illustrated as having four cylinders which operate in parallel in single stage and when double staged only one of the three cylinders acts to compress the vapor in the second stage, it is obvious that more than four cylinders may be employed, or where four cylinders are employed, two may operate as first stage cylinders and the other two as second stage cylinders.

Further, under the staged mode of compressor operation, it is possible that the solar assist evaporator 16 may have its discharge along with that of the subcooler 26 fed into the intermediate pressure point of the staged compressor, that is, the intake of the second stage cylinders. It is to be noted that the terms high and low side denote high and low pressure conditions for the vapor at the compressor.

While the invention has been particularly shown and described with reference to a preferred embodiment thereof, it will be understood by those skilled in the art that various changes in form and details may be made therein without departing from the spirit and scope of the invention.

What is claimed is:

1. A refrigeration system comprising:
    a first heat exchange coil,
    a second heat exchange coil,
    a multi-cylinder reciprocating compressor,
    conduit means carrying refrigerant and including reversing valve means for connecting said coils and said compressor in a closed series refrigeration loop with said first and second coils trading functions as system condenser and system evaporator, and wherein said reversing valve means functions to direct vaporized refrigerant from said coil functioning as system evaporator to the compressor and to direct compressed refrigerant vapor from said compressor to said coil functioning as system condenser,
    said system further comprising subcooler means operatively connected between said first coil and said second coil for removing heat from the condenser refrigerant discharging from the coil functioning as system condensor prior to supplying that condensed refrigerant to the coil functioning as system evaporator,
    a vapor return line leading from said subcooler means,
    the improvement wherein said reciprocating compressor comprises:
    a first cylinder head and a second cylinder head, said first cylinder head comprising first and second cylinders, said second cylinder head comprising third and fourth cylinders,
    said first cylinder head including first manifold means separating said first and second cylinders and defining low pressure and high pressure sides for respective cylinders,
    said second cylinder head comprising second manifold means defining commonly, low and high pressure sides for both cylinders,
    said conduit means including, means for connecting the coil functioning as the system evaporator to the low side of all cylinders for single stage compression of vaporized refrigerant from the coil functioning as the system evaporator,
    means for connecting the high side of all cylinders to the coil functioning as the system condenser,
    means for connecting the subcooler vapor return line to the low side of one of said cylinders and for cutting off that one cylinder low side to the coil functioning as the system evaporator when the refrigerant vapor within the subcooler return line is higher than the refrigerant vapor returning to the compressor from the coil functioning as the system evaporator,
    means for further connecting the high side of said one cylinder to said coil functioning as the system condenser and including means for preventing discharge from said one cylinder to flow back to the high side of said other cylinders if the pressure of that discharge is in excess of the discharge pressure at the high side of said other cylinders and
    means for selectively connecting the high sides of said other cylinders to the low side of said one cylinder in common with said subcooler return line such that said other cylinders function in first stage refrigerant vapor compression and said one cylinder functions as second stage compression with its dischage only going to the coil functioning as the system condenser.

2. The heat pump system as claimed in claim 1, wherein said solar energy heat supply means comprises a storage tank, a heat sink fluid being within said storage tank, means for selectively circulating said stored heat sink fluid to said third heat exchanger for thermal absorption by the primary loop refrigerant with said third heat exchanger acting as solar evaporator, and means for supplying solar energy supplied heat to said storage tank for heating said heat sink fluid to increase the temperature of the same.

3. The heat pump system as claimed in claim 2, wherein said solar energy heat supply means for heating of said heat sink fluid comprises a solar collector, a heat exchange coil within said storage tank, and in thermal contact with said heat sink fluid, and second conduit means for connecting said solar collector to said heat exchange coil within said storage tank and carrying a circulating heat exchange fluid therein such that solar energy impinging on said collector is transmitted to said storage tank coil for heating said heat sink fluid.

4. The heat pump system as claimed in claim 2, wherein said heat sink fluid comprises glycol and said means for circulating said glycol between said storage tank and said third heat exchanger comprises third conduit means for communicating said storage tank to said third heat exchanger, a solenoid operated control valve within said third conduit means and pump means within said third conduit means and intermediate of said storage tank and said third heat exchanger for circulating said glycol therebetween.

5. The heat pump system as claimed in claim 3, wherein said heat sink fluid comprises glycol and said means for circulating said glycol between said storage tank and said third heat exchanger comprises third conduit means for communicating said storage tank to said third heat exchanger, a solenoid operated control valve within said third conduit means and pump means within said third conduit means and intermediate of said storage tank and said third heat exchanger for circulating said glycol therebetween.

6. The heat pump system as claimed in claim 1, wherein said reciprocating compressor comprises a plurality of cylinders, and said system control means comprises means responsive to said ambient air temperature sensing means for automatically staging said compressor cylinders at low ambient temperature to increase refrigerant flow rate through said compressor.

7. The heat pump system as claimed in claim 4, wherein said reciprocating compressor comprises a plurality of cylinders, and said system control means comprises means responsive to said ambient air temperature sensing means for automatically staging said compressor cylinders at low ambient temperature to increase refrigerant flow rate through said compressor.

8. The heat pump system as claimed in claim 5, wherein said reciprocating compressor comprises a plurality of cylinders, and said system control means comprises means responsive to said ambient air temperature sensing means for automatically staging said compressor cylinders at low ambient temperature to increase refrigerant flow rate through said compressor.

9. The heat pump system as claimed in claim 6, wherein said compressor comprises a first and a second cylinder head, each cylinder head comprising two cylinders, said first cylinder head including manifold means separating said cylinders and defining low and high pressure sides for respective cylinders, said second cylinder head comprising manifold means defining commonly, low and high pressure sides for both cylinders, said first cylinder head including a first inlet to the low pressure side of one cylinder and a second inlet to the low pressure side of the other cylinder, and said second cylinder head comprising an inlet common to the low pressure side of both cylinders, said first cylinder head comprising outlets for the individual cylinders, said second cylinder head comprising an outlet common to both cylinders, a second inlet for one of the cylinders of said first cylinder head and wherein said first conduit means comprising means defining a manifold connected to the outlet of said first cylinder head having a single inlet, and to the outlet of said second cylinder head common to both cylinders, conduit means for connecting said manifold to said reversing valve and parallel with the outlet of said first cylinder head having dual low side inlets, means for connecting said manifold to said second inlet for said one cylinder of said first cylinder head, a control valve within said conduit means connecting said manifold to said second inlet of said one cylinder of said first cylinder head, check valves within said conduit leading from said manifold to said reversing valve and within said conduit means leading from said reversing valve to said first inlet to said one cylinder of said first cylinder head, such that upon energization of said second control valve, said one cylinder of said first cylinder head and both cylinders of said second cylinder head operate in first stage compression and said other cylinder of said first cylinder head operates in second stage with said check valve isolating said compressor first and second stages.

10. The heat pump system as claimed in claim 7, wherein said compressor comprises a first and a second cylinder head, each cylinder head comprising two cylinders, said first cylinder head including manifold means separating said cylinders and defining low and high pressure sides for respective cylinders, said second cylinder head comprising manifold means defining commonly low and high pressure sides for both cylinders, said first cylinder head including a first inlet to the low pressure side of one cylinder and a second inlet to the low pressure side of the other cylinder, and said second cylinder head comprising an inlet common to the low pressure side of both cylinders, said first cylinder head comprising outlets for the individual cylinders, said second cylinder head comprising an outlet common to both cylinders, a second inlet for one of the cylinders of said first cylinder head and wherein said first conduit means comprising means defining a manifold connected to the outlet of said first cylinder head heaving a single inlet, and to the outlet of said second cylinder head common to both cylinders, conduit means for connecting said manifold to said reversing valve and parallel with the outlet of said first cylinder head having dual low side inlets, conduit means for connecting said manifold to said second inlet for said one cylinder of said first cylinder head, a control valve within said conduit means connecting said manifold to said second inlet of said one cylinder of said first cylinder head, check valves within said conduit means leading from said manifold to said reversing valve and within said conduit means leading from said reversing valve to said first inlet to said one cylinder of said first cylinder head, such that upon energization of said second control valve, said one cylinder of said first cylinder head and both cylinders of said second cylinder head operate in first stage compression and said other cylinder of said first cylinder head operates in second stage with said check valve isolating said compressor first and second stages.

11. The heat pump system as claimed in claim 9, wherein said system comprises a subcooler operatively connected within said first conduit means between said indoor and outdoor coils and said subcooler includes a return line leading to said first conduit means between said manifold and said second inlet for said other cylinder of said first cylinder head upstream of said second control valve such that during multi-stage compression the refrigerant vapor from said subcooler at intermediate pressure is directed commonly with the first stage discharge to the inlet at the low side of said other cylinder constituting the second stage of said reciprocating compressor.

12. The heat pump system as claimed in claim 1, wherein said system control means comprises means responsive to said ambient air temperature sensing means for automatically staging said compressor cylinders at low ambient temperature to increase refrigerant flow rate through said compressor.

13. The heat pump system as claimed in claim 1, wherein said first cylinder head includes a first inlet to the low pressure side of one cylinder and a second inlet to the low pressure side of the other cylinder, and said second cylinder head comprising an inlet common to the low pressure side of both cylinders, said first cylinder head comprises outlets for the individual cylinders, said second cylinder head comprises an outlet common to both cylinders, a second inlet is provided for one of the cylinders of said first cylinder head and wherein a common manifold is connected to the outlet of said first cylinder head having a single inlet and to the outlet of said second cylinder head common to both cylinders, conduit means connects said common manifold to said reversing valve and parallel with the outlet of said first cylinder head having dual low side inlets, conduit means are provided for connecting said common manifold to said second inlet for said one cylinder of said first cylinder head, a control valve is provided within said conduit means connecting said manifold to said second inlet of said one cylinder of said first cylinder head, check valves are provided within said conduit leading from said common manifold to said reversing valve and within said conduit means leading from said reversing valve to said first inlet to said one cylinder of said first cylinder head, such that upon energization of said second control valve, said one cylinder of said first cylinder head and both cylinders of said second cylinder head operate in first stage compression and said other cylinder of said first cylinder head operates in second stage with said check valve isolating said compressor first and second stages.

14. The heat pump system as claimed in claim 12, wherein said first cylinder head includes a first inlet to the low pressure side of one cylinder and a second inlet to the low pressure side of the other cylinder, and said second cylinder head comprises an inlet common to the low pressure side of both cylinders, said first cylinder head comprises outlets for the individual cylinders, said second cylinder head comprises an outlet common to both cylinders, a second inlet is provided for one of the cylinders of said first cylinder head and wherein said first conduit means comprises means defining a common manifold connected to the outlet of said first cylinder head having a single inlet and to the outlet of second cylinder head common to both cylinders, conduit means connects said common manifold to said reversing valve and parallel with the outlet of said first cylinder head having dual low side inlets, conduit means connects said common manifold to said second inlet for said one cylinder of said first cylinder head, a control valve is provided within said conduit means connecting said common manifold to said second inlet of said one cylinder of said first cylinder head, check valves are provided within said conduit means leading from said common manifold to said reversing valve and within said conduit means leading from said reversing valve to said first inlet to said one cylinder of said first cylinder head, such that upon energization of said second control valve, said one cylinder of said first cylinder head and both cylinders of said second cylinder head operate in first stage compression and said other cylinder of said first cylinder head operates in second stage with said check valve isolating said compressor first and second stages.

15. The heat pump system as claimed in claim 13, wherein said subcooler includes a return line leading to said first conduit means between said manifold and said second inlet for said other cylinder of said first cylinder head upstream of said second control valve such that during multi-stage compression the refrigerant vapor from said subcooler at intermediate pressure is directed commonly with the first stage discharge to the inlet at the low side of said other cylinder constituting the second stage of said reciprocating compressor.

16. The heat pump system as claimed in claim 14, wherein said subcooler includes a return line leading to said first conduit means between said manifold and said second inlet for said other cylinder of said first cylinder head upstream of said second control valve such that during multi-stage compression the refrigerant vapor from said subcooler at intermediate pressure is directed commonly with the first stage discharge to the inlet at the low side of said other cylinder constituting the second stage of said reciprocating compressor.

17. The heat pump system as claimed in claim 10, wherein said system comprises a subcooler operatively connected within said first conduit means between said indoor and outdoor coils and said subcooler includes a return line leading to said first conduit means between said manifold and said second inlet for said other cylinder of said first cylinder head upstream of said second control valve such that during multi-stage compression the refrigerant vapor from said subcooler at intermediate pressure is directed commonly with the first stage discharge to the inlet at the low side of said other cylinder constituting the second stage of said reciprocating compressor.

* * * * *